(No Model.)

G. W. MILLER.
HAND VISE.

No. 448,452. Patented Mar. 17, 1891.

Witnesses.
J. H. Shumway
Lillian D. Kelsey

George W. Miller
Inventor
By Attys.
Earle Seymour

UNITED STATES PATENT OFFICE.

GEORGE W. MILLER, OF MERIDEN, CONNECTICUT.

HAND-VISE.

SPECIFICATION forming part of Letters Patent No. 448,452, dated March 17, 1891.

Application filed December 30, 1889. Serial No. 335,385. (No model.)

*To all whom it may concern:*

Be it known that I, GEORGE W. MILLER, of Meriden, in the county of New Haven and State of Connecticut, have invented a new Improvement in Hand-Vises; and I do hereby declare the following, when taken in connection with accompanying drawings and the letters of reference marked thereon, to be a full, clear, and exact description of the same, and which said drawings constitute part of this specification, and represent, in—

Figure 1:
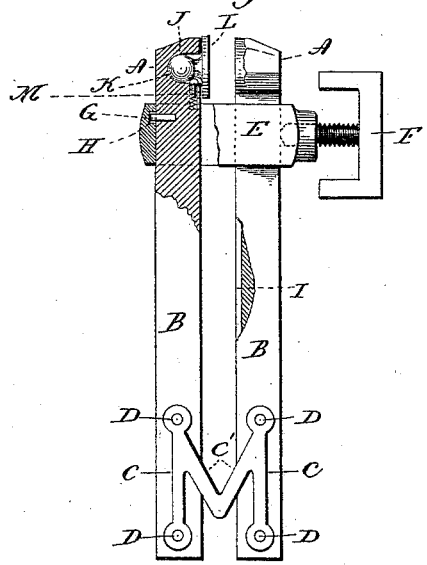
Figure 2:
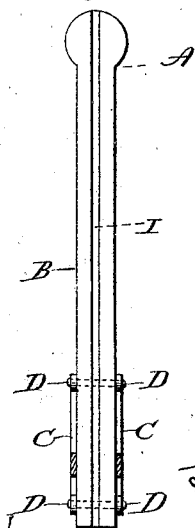

Figure 1, a view, partly in elevation and partly in section, of a hand-vise embodying my invention; Fig. 2, a detached view, in inside elevation, of the grooved jaw and shank, showing also both of the M-shaped springs.

My invention relates to an improvement in hand-vises, the object being to produce a simple, effective, and durable device especially adapted for holding wire rods in long lengths.

With these ends in view my invention consists in the combination, with two parallel straight jaw-shanks which co-operate to form the sole handle of the tool, of one or more stationary flat springs applied to the said shanks near but within their outer ends and so as to hold their inner edges a virtually-fixed distance apart, a yoke embracing the shanks and provided with a screw for drawing them together, and a bearing-piece flexibly connected to one of the jaws.

My invention further consists in springs of peculiar form for coupling the jaw-shanks together, and in certain other details of construction, as will be hereinafter described, and pointed out in the claims.

As herein shown, each vise-jaw A is provided with a straight shank B, the inner edge whereof is in the same plane with its inner or working face. The said shanks are substantially parallel and co-operate to form the handle of the tool. They are secured together with a clearance-space between the inner edges and extending throughout their length by means of two flat stationary M-shaped coupling-springs respectively applied to the opposite faces of their outer ends, so as to hold their inner edges a fixed distance apart and establish the clearance-space aforesaid. The parallel portions C of the said coupling-springs are secured by rivets D passing through their ends, which are thereto enlarged, to the jaw-shanks, leaving their V-shaped portions C' free to spring, which the said straight portions C do also, between their fixed ends, but to a less degree. The said coupling-springs thus fulfill the twofold office of coupling the jaw-shanks together and also of automatically separating the jaws to release the objects placed between the same. The said jaws are drawn together to clamp them upon the work by means of a movable yoke E, embracing the jaw-shanks at points thereon close to the jaws and extended and bored out at one end to receive an adjusting thumb-nut F, which forces the jaws together against the tension of the coupling-springs. The said yoke is prevented from slipping upon the jaw-shanks by a pin G, extending outward from the outer edge of one of them and entering a hole H, formed to receive it in the adjacent end of the yoke, the said pin and hole being proportioned so as to permit some flexibility of movement in the yoke, which, if desired, may be detached from the pin and slipped farther away from the jaws, which are thus enabled to receive a larger object between them. A longitudinal groove I, extending throughout the length of one jaw and its shank, is provided for adapting the tool to better grip an object, and particularly to adapt it to better receive, accommodate, and hold a wire rod or an object of corresponding form, which may extend between and even beyond the outer ends of the shanks. The other jaw has an open socket J formed in its inner face to receive a ball K, formed upon the outer face of a bearing-piece L, which is held in place by a spring-pressed pin located in a bore M, formed in the said jaw and opening into the edge of the said socket, the pin being engaged with the ball near the neck thereof, whereby the said bearing-piece is held in place, but not prevented from accommodating itself in position to the contour of any object which may be placed between the jaws. I do not, however, in this application claim the said bearing-piece in itself, nor the means employed by me for holding it in place, the latter being claimed in another application, Serial No. 320,078, filed by me August 8, 1889.

By providing a clearance-space between the jaw-shanks throughout their length a rod or other object of corresponding form may be worked in the vise independent of its length, and therefore without any waste in cutting it to be received by the vise. This feature of my improved tool makes it very convenient and economical for jewelers, who will use it chiefly for working wire rods. Furthermore, the longitudinal groove in one of the jaws and shanks enables the vise to take a very strong hold upon a rod or other object of like shape. My improved tool is also light, simple, convenient, and very effective in use.

I do not limit myself to the exact construction shown and described, but hold myself at liberty to make such changes and alterations as fairly fall within the spirit and scope of my invention.

I am aware that a hand-vise having a clearance-space adapting it to receive and grip a rod of any length is not broadly new; that it is not broadly new to form a longitudinal groove in a jaw-shank the inner end whereof is separated from the inner end of its fellow; that a clamp having two straight parallel clamping-arms held open by a spring is old, and that a yoke embracing the shank of a vise is old, as well as a bearing-piece flexibly connected with a vise-jaw. I do not therefore claim any of such constructions broadly; but, Having fully described my invention, what I claim, and desire to secure by Letters Patent, is—

1. In a hand-vise, the combination, with two straight parallel jaw-shanks which co-operate in forming the sole handle of the tool, of one or more flat springs extending laterally across the jaw-shanks in the plane thereof and secured at two or more points to each jaw-shank, whereby they are rigidly secured to the said jaw-shanks and a clearance-space established between the same, substantially as described.

2. In a hand-vise, the combination, with two straight parallel jaw-shanks which co-operate in forming the sole handle of the tool, of two flat stationary M-shaped springs applied to the opposite faces of the shanks near but within the outer ends thereof and each connected at two separated points with each of the jaw-shanks, a yoke embracing the shanks and provided with a screw adapted to pull the same together, and a bearing-piece flexibly connected with one of the jaws, substantially as described.

GEORGE W. MILLER.

Witnesses:
GEORGE A. CLARK,
WILLIS I. HENN.